United States Patent [19]
Smith et al.

[11] Patent Number: 5,669,129
[45] Date of Patent: Sep. 23, 1997

[54] LOCATOR STRIP AND METHOD FOR POSITIONING FABRIC COVERS ON A FOAM CUSHION

[75] Inventors: James M. Smith, Roseville; Terrie J. LaPalm, Melvindale, both of Mich.

[73] Assignee: Lear Corporation, Southfield, Mich.

[21] Appl. No.: 636,564

[22] Filed: Apr. 23, 1996

[51] Int. Cl.[6] .................................................. B68G 7/00
[52] U.S. Cl. .......................................... 29/91.1; 29/418
[58] Field of Search ........................... 29/91, 91.1, 91.2, 29/91.6, 91.7, 418; 297/452.26, 452.32, 452.35, 452.58, 452.6, 452.61; 112/417, 418

[56] References Cited

U.S. PATENT DOCUMENTS

| | | |
|---|---|---|
| 4,765,045 | 8/1988 | Selbert et al. |
| 4,885,828 | 12/1989 | Kozlowski |
| 4,987,666 | 1/1991 | Smith ............................. 29/91.1 |
| 5,175,916 | 1/1993 | Klems |
| 5,231,745 | 8/1993 | Phelan et al. ................. 29/91.1 |

FOREIGN PATENT DOCUMENTS

| | | | |
|---|---|---|---|
| 2262588 | 9/1975 | France | ......................... 297/452.61 |
| 97772 | 3/1992 | Japan | ................................... 29/91 |
| 269580 | 9/1994 | Japan | ................................... 29/91 |

*Primary Examiner*—David P. Bryant
*Attorney, Agent, or Firm*—Howard & Howard

[57] ABSTRACT

A locator strip (10) accurately positions upholstering trim covers (12,14) upon a seat cushion (16) in the manufacture of seats. The locator strip (10) includes a positioning portion (28) which extends longitudinally along substantially the entire length of the strip (10). In one embodiment, the positioning portion comprises a pair of beads (40) running longitudinally along substantially the entire length of the strip (10). The positioning portion (28) is adapted to locate a sewing thread (36) in a detachment zone (38) of the strip (10). The detachment zone (38) has a strength less than the remainder of the strip (10). When a pulling force is applied in a direction away from the insert portion (24), the strip (10) tears along the detachment zone (38). A method of covering a cushion member (16) with trim covers (12,14) is also disclosed.

8 Claims, 3 Drawing Sheets

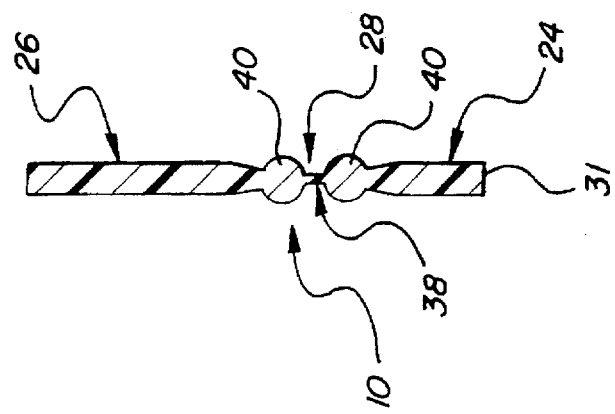
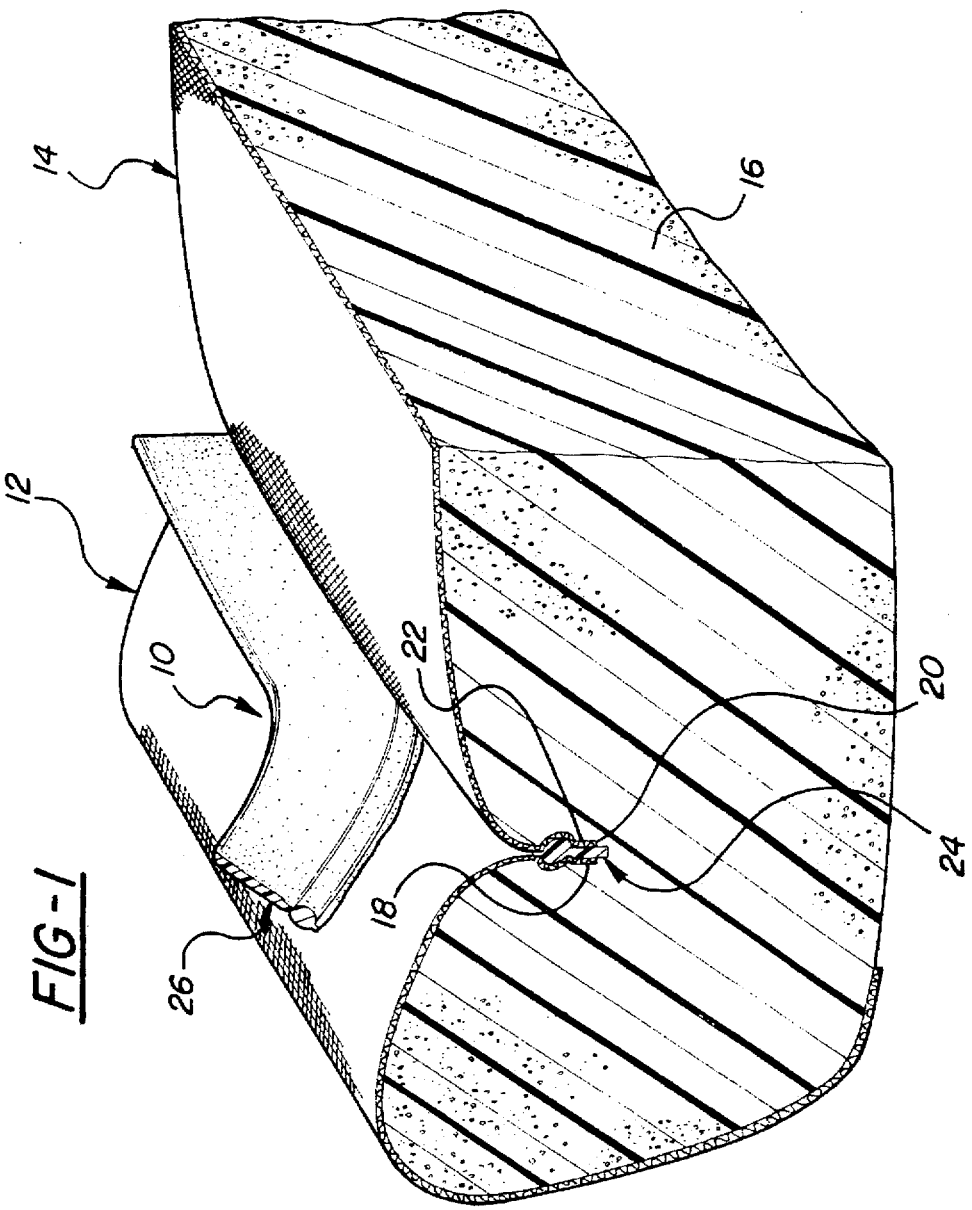

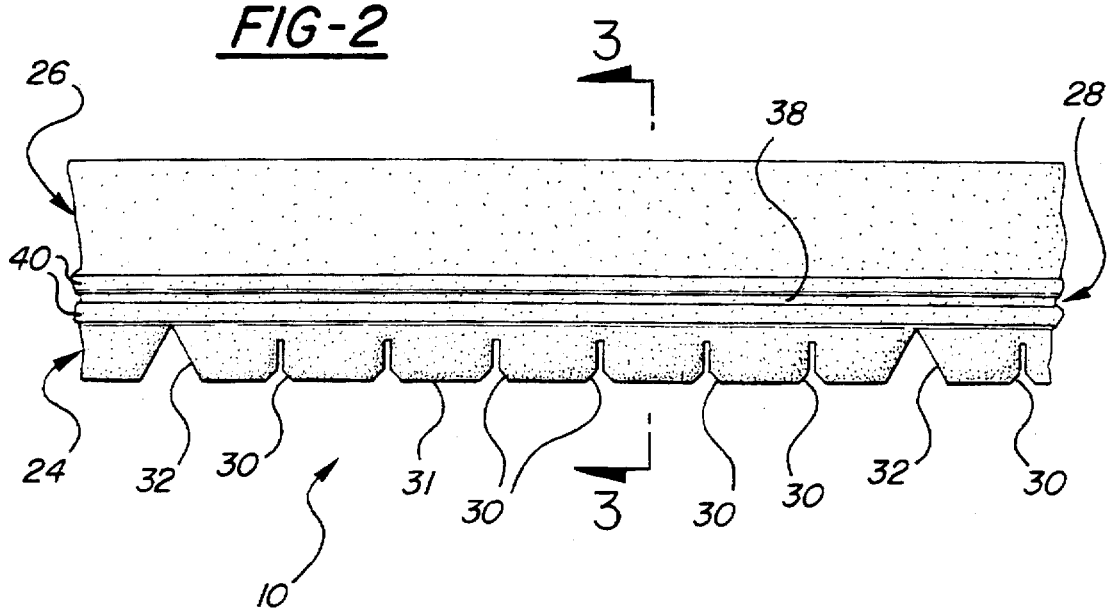
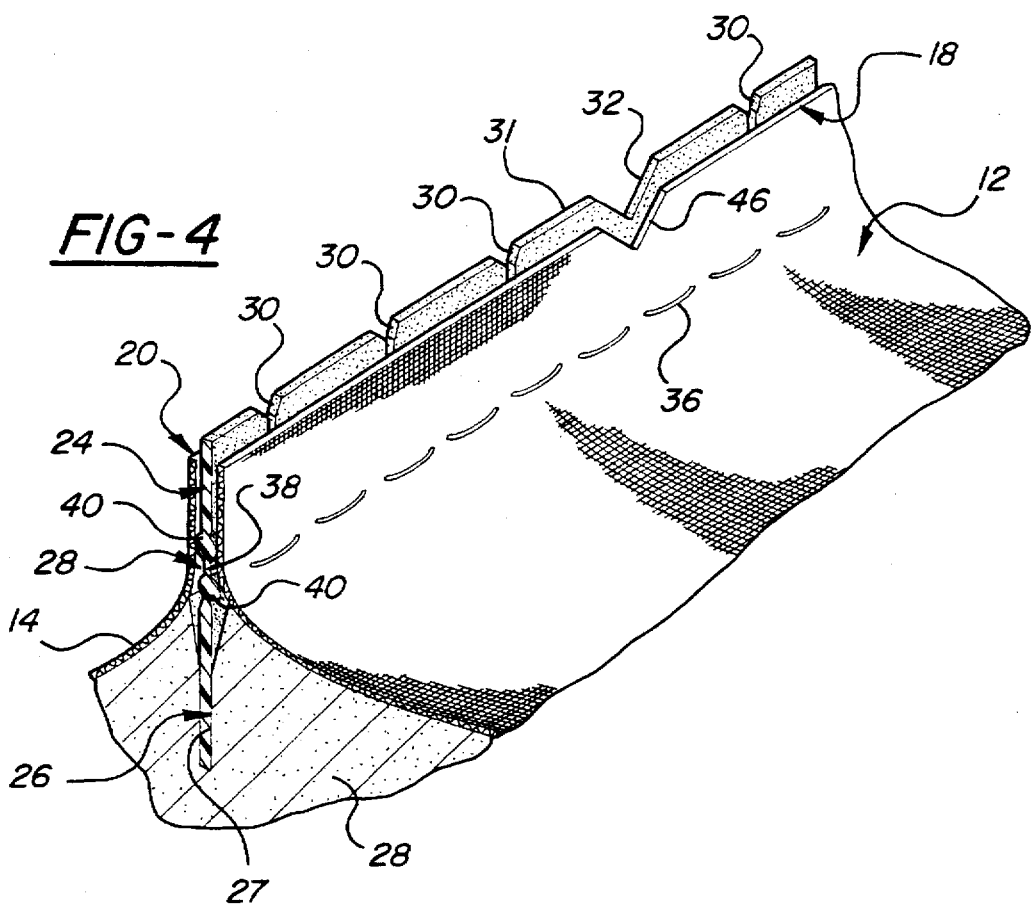

LOCATOR STRIP AND METHOD FOR POSITIONING FABRIC COVERS ON A FOAM CUSHION

BACKGROUND OF THE INVENTION

The present invention relates generally to a method and assembly for upholstering a foam cushion member with a pair of trim covers. More particularly, the invention relates to a method and assembly for locating the sew seam of the two covers in a predetermined position on the cushion member.

The covering of foam cushion members with fabric for use in vehicular seats is commonly performed with automated upholstering equipment. For aesthetic purposes, it is frequently desirable to cover the cushion with two or more fabrics of different colors, patterns, etc., which have been arranged in an attractive fashion. The two or more fabric pieces are generally sewn together along their edges, with the sew seam slightly recessed into the cushion for comfort. During an automated upholstering process, however, the fabric covers have a tendency to shift out of the proper orientation on the cushion. As such, the sew seams of the two or more fabrics covering the cushion slip out of place.

The prior art U.S. Pat. No. 4,765,045 to Allen J. Selbert et al, issued Aug. 23, 1988, discloses the use of a plastic locator strip which is sewn between two pieces of fabric covering at the sew seam. The fabric covering pieces and locator strip are sewn along two stitch lines to properly connect the fabric pieces to each other and to the locator strip. The locator strip is adapted to be held in an automated tool for positioning the sew seam of the two fabrics into a groove in the cushion. After the upholstering process is complete, the locator strip is torn from the fabric and cushion by disjoining a portion of the strip, thereby leaving a non-removable solid base of the locator strip underneath the sew seam which is permanently embedded in the cushion. In the upholstering process disclosed in this reference, the stitches sewing the fabric covers to the strip may drift from a desired location, thus making it more difficult to remove the exposed portion of the strip and increasing the frequency of sew seam failure. A solid base portion of the strip is also left embedded underneath the fabric covers, which is bothersome and uncomfortable to sit on or lean against. This is due in part to the strip's inability to hold the edges of the covers upright for properly positioning the seam in the cushion.

The U.S. Pat. No. 4,885,828 to Eric F. Kozlowski, granted Dec. 12, 1989 and assigned to the assignee of the present invention, discloses the use of a similar plastic locator strip for properly positioning upholstery fabric in relation to a seat cushion in the manufacture of a seat. Kozlowski '828, however, teaches the concept of providing a strip which is entirely removable from the seat. Kozlowski discloses a locator strip which includes an insertion portion adapted to be inserted between the sewn-together edges of the fabric covers. The insertion portion has a plurality of spaced apart, finger-like projections joined together at their distal ends by thin transverse filament. The fingers and filament define a plurality of openings or pockets for accommodating the stitches of the seat. After the covers have been properly joined to the cushion, the strip is removed by pulling on an extension portion of the strip, causing the sections of filament between the fingers to pull against the stitches and break for intended removal with the remaining portions of the strip. Kozlowski discloses the concept of a completely removable strip. Actual use of such a strip has shown that the sections of filament between the fingers offer too great of a resistance to breakage so as to loosen or damage the stitching of the seat when removing the strip. Further, the filament sections have a tendency to break in more than one location between the fingers causing small pieces of filament material to remain in the seam which must be removed manually in a separate operation. Because the insertion portion is of reduced mass, the strip may also fail to provide sufficient stability during the upholstery process thereby sometimes causing wavy seams in the upholstered cushion.

The U.S. Pat. No. 5,175,916 to William F. Klems, granted Jan. 5, 1993, also assigned to the assignee of the present invention, discloses another plastic locator strip for accurately positioning upholstering fabric upon a seat cushion in the manufacture of seats. Klems '916 also discloses a locator strip which is entirely removable from the covers and cushion of the seat. The thin transverse filament sections joining the finger-like projections are formed with notches or cuts between the projections. The locator strip may be removed by pulling on the extension portion of the strip, causing the thin filament sections to yield at the notches or cuts. Although Klems discloses an improvement over the locator strip of Kozlowski, the locator strip of Klems has not been completely satisfactory in the upholstering process. In particular, the frequency in which the stitching of the seats is loosened or damaged as a result of the removal of the locator strip is still unacceptable.

The prior art has not successfully addressed these problems. Accordingly, there is still a need in the industry for a locator strip that will not damage the stitching of the seat upon removal. There is also a need for a cover assembly process which will accurately position the stitches through the fabric covers and locator strip.

SUMMARY OF THE INVENTION

The present invention concerns a positioning strip for use in upholstering a foam cushion member with trim covers, wherein each of the covers have edges adapted to be fastened together and received in an elongated slot in the cushion member. The strip comprises an insert portion adapted for disposing the edges of the covers within the elongated slot of the cushion member, and an extension portion extending outwardly of the insert portion adapted for receiving a pulling force in a direction away from the insert portion. The positioning strip is characterized by including a positioning portion which extends longitudinally along substantially the entire length of the strip and defines a detachment zone, wherein the positioning portion is adapted to fasten the covers to the positioning strip along the detachment zone. In one embodiment, the positioning portion includes a pair of parallel, spaced beads which may, for example, cooperate with the head of a sewing apparatus to pass a sewing thread through the detachment zone. The detachment zone has a lesser strength than the remainder of the strip for causing the detachment zone to preferentially yield in response to an applied pulling force. In one embodiment, the detachment zone comprises a narrow channel disposed between the pair of beads.

In preferred embodiments of the present invention, the insert portion of the strip may have a plurality of notches disposed along a lateral edge of the strip to provide improved flexibility of the insert portion. The insert portion may also include a positioning notch disposed along the lateral edge of the strip for alignment with notches in the edges of the covers.

A method of covering a cushion member with a pair of trim covers using the locator strip of the present invention is also disclosed.

BRIEF DESCRIPTION OF THE DRAWINGS

The above, as well as other advantages of the present invention, will become readily apparent to those skilled in the art from the following detailed description of a preferred embodiment when considered in light of the accompanying drawings in which:

FIG. 1 is a perspective view of a locator strip partially detached from an upholstered cushion;

FIG. 2 is a front view of a locator strip in accordance with the present invention;

FIG. 3 is a cross-sectional end view of the locator strip taken along lines 3—3 of FIG. 2;

FIG. 4 is a perspective view of the locator strip sewn between the edges of two covers and supported in the upholstering tool;

DESCRIPTION OF THE PREFERRED EMBODIMENT

Figure 5:
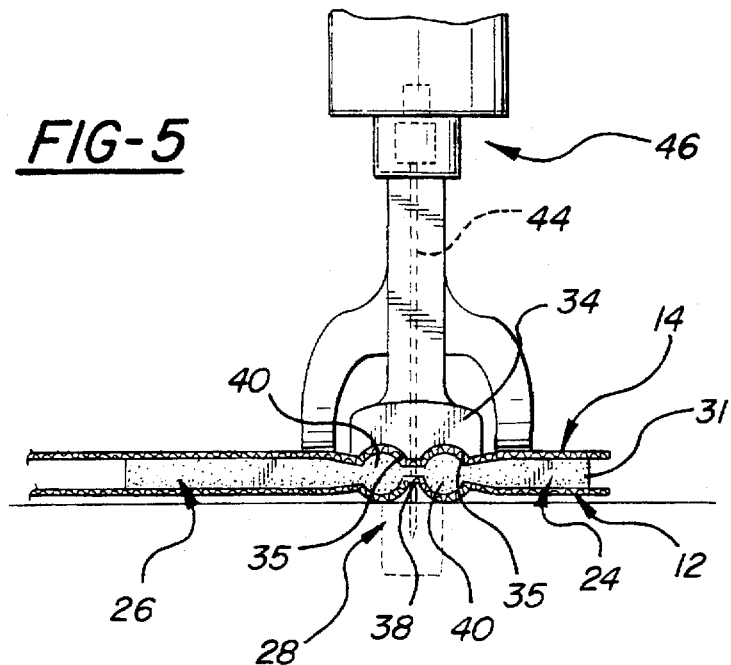
FIG. 5 is a cross-sectional view of the locator strip and covers during sewing of the covers.

Referring to the figures, wherein like numerals indicate like corresponding parts throughout the several views, a locator strip assembly is generally shown at 10. The locator strip 10 is particularly adapted for positioning two trim covers, generally indicated at 12 and 14 in FIGS. 1, 4, 5 and 6, upon a foam seat cushion 16. Preferably, covers 12 and 14 are of different colors or patterns to present an aesthetically attractive upholstered vehicular seat. Covers 12,14 may comprise any conventional material, including fabric or leather. Respective edges 18 and 20 of the covers 12 and 14 are adapted to be sewn together, with the sew seam deposited in an elongated slot 22 provided in the cushion 16. In this manner, the loose edges 18 and 20 are embedded in the cushion with the two covers 12 and 14 extending laterally from the sew seam leaving an attractively upholstered cushion 16.

As shown in FIGS. 2 and 3, the locator strip 10 includes an insert portion, generally indicated at 24, which is adapted to be secured between the edges 18 and 20 into the slot 22 in the cushion 16. An extension portion, generally indicated at 26, extends outwardly from the insert portion 24 for receiving a pulling force in a direction away from the insert portion 24. As shown in FIG. 4, the extension portion 26 is also adapted to be supported in an automated upholstering tool 28 moveable toward and away from the cushion 16 during the automatic upholstery process, as will be described in greater detail subsequently. The extension portion 26 has a generally flat rectangular cross section; however, the extension portion may have rounded edges to facilitate properly locating the extension portion 26 in the tool 28. The extension portion 26 extends longitudinally of the locator strip 10. Strip 10 is adapted to positively position the edges 18, 20 of covers 12, 14 in an upright position for proper orientation in groove 22 of cushion 16. Thus, unlike prior art locator strips, edges 18, 20 remain substantially erect in groove 22 of cushion 16, providing a smooth feel and A positioning portion, generally indicated at 28, is disposed between the insert portion 24 and the extension portion 26 of the strip 10. The positioning portion 28 comprises a pair of beads 40 which run longitudinally along substantially the entire length of the strip 10. As best shown in FIG. 5, the positioning portion 28 cooperates with the head 34 of a sewing apparatus 46 to accurately position the sewing thread 36 along a detachment zone 38 of the locator strip 10. The positioning portion 28 may comprise any type of abutments which are adapted to fasten the covers 12,14 along the detachment zone 38 of the strip 10. The positioning portion 28 is sewn, or stitched, between the edges 18 and 20 of the two covers 12 and 14, respectively, at the same time as the two covers 12 and 14 are sewn together. The head 34 of the sewing apparatus 46 is configured to closely match the contour of the beads 40. Thus, beads 40 are received in grooves 35 of the head 34. During the sewing process, the sewing needle 44 passes between the beads 40 through the detachment zone 38, thereby locating the sewing thread 36 in the detachment zone 38 of the strip 10. The positioning portion 28 defines the detachment zone 38 which preferably comprises a relatively narrow channel disposed between the beads 40. Thus, unlike locator strips of the prior art, locator strip 10 facilitates attaching edges 18, 20 of covers 12, 14 to each other and to strip 10 in a single sewing step. This also provides a mechanism for attaching edges 18, 20 to locator strip 10 such that edges 18, 20 remain upright during the upholstering process. Thus, the resulting upholstered cushion incorporates the edges 18, 20 of the covers 12, 14 in a substantially erect fashion.

The insert portion 24 and the extension portion 26 preferably taper inwardly toward the beads 40. The thickness of the detachment zone 38 is less than the thickness of the insert portion 24 and the extension portion 26 of the locator strip 10. The decreased thickness in the detachment zone 38 together with the perforations created by the sewing thread 36 passing through the detachment zone 38 provide a zone having a lesser strength along the longitudinal length of the strip 10. Thus, when a pulling force is applied to the extension portion 26 of the strip 10 in a direction away from the insert portion 24, the detachment zone 38 preferentially yields, thereby providing the detachment of the extension portion 26 from the insert portion 24 of the locator strip 10.

As best shown in FIG. 2, the insert portion 24 may include an array of notches 30 and 32 along a lateral edge 31 opening in a direction away from the extension portion 26. The notches 30 and 32 provide flexibility to the locator strip 10 and, more particularly, to the insert portion 24 of the locator strip 10. In the finished upholstered cushion 16, the insert portion 24 having the notches 30 and 32 is embedded in the slot 22 of the cushion 16. The slots 30 and 32 facilitate flexing of the insert portion 24 disposed in the slot 22 of the cushion 16, thereby providing a smoother, more flexible feel to the cushion surface along the slot 22. The larger V-shaped notches 32 can be used to align the respective edges 18 and 20 of the covers 12 and 14 in a predetermined position. For example, the covers 12 and 14 may have a pattern on the outer surfaces thereof which must be aligned. A notch 46 may be formed in the covers 12 and 14. During the upholstering process, notches 46 of the covers 12 and 14 and notch 32 of the strip 10 are aligned and then sewn together. Because the patterns on covers 12 and 14 face inwardly during the sewing step, the notches assure alignment of the pattern which would otherwise be difficult to accomplish. The notches 32 and the locator strip 10 may also be used to align the locator strip 10 longitudinally along the respective edges 18 and 20 of the covers 12 and 14.

Preferably, the subject locator strip 10 is fabricated from a homogeneous organic polymeric material, such as medium density polyethylene.

Turning now to the preferred method for covering a cushion 16 with covers 12 and 14, the upholstering operation incorporating the locator strip 10 will be addressed presently. The elongated slot or groove 22 is first formed in the cushion 16 in the exact location desired to receive the sew seam between the two covers 12 and 14. The locator strip 10 is then positioned between the edges 18 and 20 of the two covers 12 and 14, respectively. Preferably, edges 18, 20 are essentially flush with edge 31 of strip 10. Notches 46 in the covers 12 and 14 may then be aligned with the notches 32 of the strip 10. The edges 18 and 20 of the covers 12 and 14 are fastened together about the positioning portion 28 of the locator strip 10, preferably in a single sewing step. Thread 36 passes in and out between the covers 12 and 14 in a typically sewing fashion. As mentioned above, the head 34 of the sewing apparatus 46 cooperates with the beads 40 to accurately position the sewing needle 44 and thread 36 in the detachment zone. Thus, the thread 36 passes through the locator strip 10 along the detachment zone 38.

Figure 6:
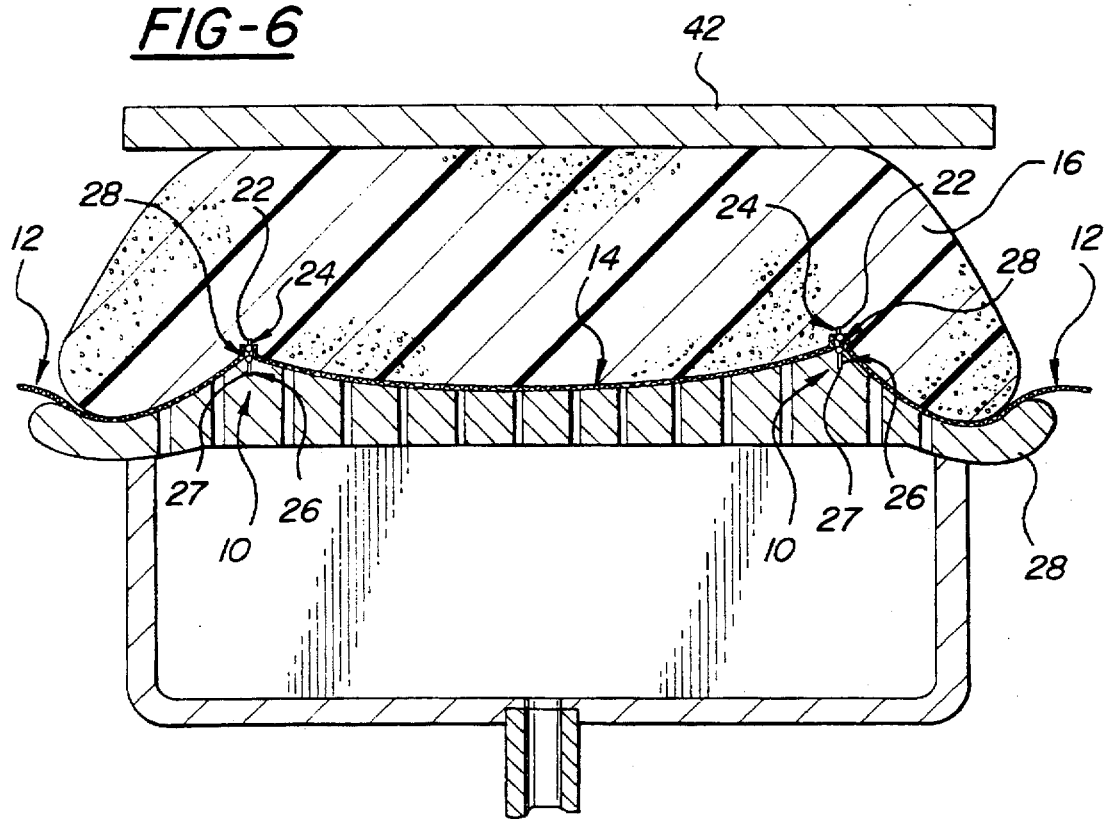
FIG. 6 is a cross-sectional view of an automated upholstering installation including two locator strips positioning three covers on a cushion.

The extension portion 26 of the locator strip 10 is then supported in an automated upholstering tool 28 which preferably takes the form of a heatable mold for activating a heat sensitive bonding agent to bond the covers 12 and 14 to the cushions 16. The extension portion 26 of the locator strip 10 is received in a corresponding locating groove 27 recessed in the surface of the tool 28 to properly position the covers 12,14 along the tool surface for mating engagement with the foam cushion 16. That is, the locator strip 10 is received in the groove 27 of the tool 28 to properly align the covers 12,14 with the contoured bonding surface of the foam cushion 16. As shown in FIG. 6, the cushion may be supported adjacent a platen 42 in an orientation facing the tool 28. The tool 28 and platen 42 are then moved toward each other, relatively, until the insert portion 24 and the respective edges 18 and 20 of the covers 12 and 14 penetrate the slot 22 in the cushion 16 to exactly position the covers 12 and 14 upon the cushion 16 with edges 18, 20 substantially erect in groove 22 of cushion 16. The covers 12 and 14 are then adhesively bonded to the outer surface of the cushion 16, as described above or in any other manner well known in the art.

Once the covers 12 and 14 have been bonded to the exterior of the cushion 16, as shown in FIG. 1, the seat assembly is removed from the automatic upholstering equipment and the locator strip 10 remains secured to the sew seam and partially embedded in the groove 22. As soon as the bonding agent between the covers 12 and 14 and the cushion 16 has sufficiently cured, the exposed portion of the locator strip 10 is removed by applying a pulling force upon the extension portion 26 in a direction away from the insert portion 24 and the sew seam. The detachment zone 38 having a lesser strength than the remainder of the strip 10 yields or tears, separating the extension portion 26 from the insert portion 24. The insert portion 24 remains in the slot 22 of the cushion 16. In this manner, the insert portion 24 of the locator strip 10 remains in the groove 22 of the cushion 16 and the extension portion 26 is removed from the cushion 16.

The upholstering of a cushion 16 by utilizing the subject locator strip 10 results in an attractive and comfortable seat due to the perfectly oriented covers 12 and 14. The insert portion of the locator strip 10 remaining in the cushion 16 cannot be easily detected from the outer surface of the cushion 16. The insert portion 24 of the locator strip 10 is left embedded in the cushion 16 below the covers 12 and 14 and the thread 36. The notches 30 and 32 facilitate flexing of the insert portion 24 in the cushion.

The invention has been described in an illustrative manner, and it is to be understood that the terminology used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specified described.

We claim:

1. A positioning strip (10) for use in upholstering a foam cushion member (16) with a pair of covers (12,14), each of the covers (12,14) having an edge (18,20) to be fastened together along said strip and received into an elongated slot (22) in the cushion member (16), said strip (10) comprising:

an insert portion (24) extending longitudinally between first and second ends of the strip for disposing the edges (18,20) of the covers (12,14) within the slot (22) of the cushion member (16);

an extension portion (26) extending outwardly away from insert portion (24) for receiving a pulling force in a direction away from said insert portion (24); and a positioning portion (28) extending longitudinally along substantially the entire length of said strip (10) between said insert portion (24) and said extension portion (26), said positioning portion (28) including a pair of parallel, spaced apart cylindrical beads (40) extending longitudinally along the length of said strip (10) and defining a detachment zone there between, said detachment zone comprising a channel (38) disposed between said beads (40) for securing the edges of the covers along opposing sides of said strip between said beads, wherein said channel (38) has a lesser strength than the remainder of said strip (10) for causing said channel (38) to yield in response to an applied pulling force to separate said extension portion (26) from said insert portion (24).

2. A strip (10) according to claim 1 wherein said channel (38) has a thickness significantly less than the thickness of the remainder of the strip (10).

3. A strip (10) according to claim 1 wherein said insert portion (24) has a plurality of notches (30,32) disposed along a lateral edge (31) of the strip (10).

4. A strip (10) as set forth in claim 1, wherein said insert portion (24) includes notches (32) disposed along a lateral edge (31) of the strip (10) for aligning with notches (46) in the covers (12,14).

5. A strip (10) according to claim 1 wherein said insert portion extends outwardly from one of said beads and said extension portion extends outwardly along the same plane from the other of said beads in a direction opposing said insert portion.

6. A method of covering a cushion member (16) with a pair of covers (12,14) using a locator strip comprising an insert portion (24), an extension portion (26) and a positioning portion (28) extending longitudinally along substantially said positioning (28) including a pair of parallel, spaced apart cylindrical beads (40) extending longitudinally along the length of said strip (10) the entire length of said strip between the insert portion and the extension portion, and defining a detachment zone (38) therebetween, each of the covers (12,14) having an edge (18,20) to be fastened together along opposing sides of the strip along the detachment zone said method comprising the steps of:

forming an elongate slot (22) in the cushion member (16);

positioning the locator strip (10) between the edges (18, 20) of the covers (12,14) with the insert portion disposed between the edges (18,20) of the covers (12,14) and the extension portion extending outwardly from the edges;

fastening the edges (18,20) of the covers (12,14) along opposing sides of the strip (10) in a plurality of spaced, discrete fastened locations along the detachment zone (38) of the strip (10) between the beads;

inserting the edges (18,20) of the covers (12,14) and the insert portion (24) of the strip (10) into the slot (22) in the cushion member (16);

bonding the covers (12,14) to the cushion member (16); and pulling the extension portion (26) of the strip (10) in a direction away from the insert portion (24) of said strip (10) and tearing the detachment zone to separate the extension portion from the insert portion.

7. A method according to claim 6, wherein said detachment zone (38) comprises a narrow channel (38) disposed between the beads (40), said method including sewing a thread (36) through said channel (38), and tearing the strip along said channel (38) by pulling the extension portion (26) of the strip (10).

8. A method according to claim 6, wherein said detachment zone (38) comprises a narrow channel (38) disposed between the beads (40), said method including adapting a head (34) of a sewing apparatus (46) to cooperate with the beads (40) and sewing a thread (36) through the edges (18,20) of the covers (12,14) and the channel (38).

* * * * *